United States Patent
Glidden et al.

(10) Patent No.: US 7,788,325 B1
(45) Date of Patent: Aug. 31, 2010

(54) EMAIL ADDRESS IDENTIFIER SOFTWARE, METHOD, AND SYSTEM

(75) Inventors: Kenneth A Glidden, Roslindale, MA (US); Andrew Paulsen, San Francisco, CA (US)

(73) Assignee: Hoover's Inc., Short Hills, NJ (US)

( * ) Notice: Subject to any disclaimer, the term of this patent is extended or adjusted under 35 U.S.C. 154(b) by 1413 days.

(21) Appl. No.: 10/710,361

(22) Filed: Jul. 3, 2004

Related U.S. Application Data

(60) Provisional application No. 60/485,195, filed on Jul. 7, 2003.

(51) Int. Cl.
*G06F 15/16* (2006.01)
(52) U.S. Cl. ...................................... 709/206
(58) Field of Classification Search ........................ None
See application file for complete search history.

(56) References Cited

U.S. PATENT DOCUMENTS

| | | | |
|---|---|---|---|
| 6,694,353 B2 | 2/2004 | Sommerer | 709/206 |
| 7,010,572 B1 * | 3/2006 | Benjamin et al. | 709/206 |
| 7,203,706 B2 * | 4/2007 | Jain et al. | 707/104.1 |
| 2002/0013817 A1 * | 1/2002 | Collins et al. | 709/206 |
| 2002/0087647 A1 * | 7/2002 | Quine et al. | 709/206 |
| 2002/0143879 A1 | 10/2002 | Sommerer | 709/206 |
| 2002/0181466 A1 | 12/2002 | Neustein et al. | 370/393 |
| 2002/0188690 A1 * | 12/2002 | Lee | 709/206 |
| 2003/0115279 A1 * | 6/2003 | Quine et al. | 709/207 |
| 2003/0200265 A1 * | 10/2003 | Henry | 709/206 |
| 2003/0225842 A1 | 12/2003 | Li et al. | 709/206 |
| 2003/0233353 A1 | 12/2003 | Taylor | 707/3 |

OTHER PUBLICATIONS

Setting up Catch All Email, Oct. 5 2002, WebArchive, Wayback machine, retrieved from http://web.archive.org/web/20021005140238/http://www.jiffynet.net/faqs/catchallemailsetup.html pp. 1-3.*

Sherwood, Kaitlin, Finding Someone's Email Address, May 23, 2001, pp. 1-7, retrieved from http://webfoot.com/advice/FindingEmailAddresses.php.*

* cited by examiner

*Primary Examiner*—John Follansbee
*Assistant Examiner*—Matthew S Lindsey
(74) *Attorney, Agent, or Firm*—Ohlandt, Greeley, Ruggiero & Perle, LLP

(57) ABSTRACT

A system and method for users to determine the email addresses of persons whose data used to develop email addresses and email server address is known. The system generates email address guesses and uses the returned mail feature of the persons email server to test these email address possibilities until a successful address is found. The system sends the desired email message, and provides the successful address and a copy of the sent email to the user.

1 Claim, 6 Drawing Sheets

EMAIL ADDRESS IDENTIFIER SOFTWARE, METHOD, AND SYSTEM

CROSS REFERENCE TO RELATED APPLICATIONS

This application claims priority from Provisional Patent Application 60/485,195, "Email Address Identifier Software, Method, and System" filed on Jul. 7, 2003, which is incorporated herein by reference.

FEDERAL RESEARCH STATEMENT

Not Applicable

BACKGROUND OF INVENTION

Field of the Invention

This invention is a method and system for determining a person's electronic mail (email) address. A computer-processed algorithm generates candidate email addresses based on the known email server address of the target person and some known data items about the target person, such as the name. The email addresses are tested sequentially with each test monitored for an invalid address prior to testing the next address. When a valid address is found, testing is halted and the user is notified of email delivery.

DESCRIPTION OF RELATED ART

This invention is a new method and system of finding a person's email address. Sending email is often preferred over other mediums of communication, such as the telephone. Often it is desirable for a person to be able to send email to a person when their exact email address is not known. The existing email systems, however, require an exact email address in order to deliver an email message to the desired recipient. There are existing services that provide email addresses, but they are very different from this invention. The existing services can be categorized into two groups, email databases and email lists, although there are many variants of these services that can be categorized differently.

The first group, email databases, are collections of people's addressees recorded and maintained in a database. The size, coverage and freshness of these databases vary significantly by provider. One may simply think of these databases as a large phone book. Users may search these databases for the email address they are looking for, just as if they were searching within a phone book. The success of the search is based upon the requirement that the target recipient, which is the person's email address that they are looking for, has been recorded in the database and is up to date. One might type in John Doe, as an example, and the database may give a match for this person's name, or the search may result in a "no match".

There are many existing services that build databases of email addresses. A few examples include, but are not limited to; peoplefind.com, peoplesearch.com, switchboard.com, classmates.com, bigfoot.com. Most major portals, such as Yahoo, AOL and Terra Lycos, also provide this type of service.

The second group is email lists. These services are simply lists of email addresses that are sold to people desiring to market their products or services via email. These lists are usually sold by volume and coverage of the list. An example is one might sell an email list of people living in San Francisco, over age 19, with incomes above $50,000. There are many existing services that sell email lists such as, but not limited to: servworks.com, infousa.com, listsbank.com, usa-data-mailinglists.com and buylistsonline.com.

In these two groups, you are either looking for a person's email address in a database of existing data or you are purchasing a list of email addresses. In both groups, it is very likely that some email addresses will be outdated.

Some inventors have attempted to address the problem of assisting a user in correcting email addresses. U.S. Pat. No. 6,694,353 (Sommerer) discloses a means for notifying a user of the need to update an email address based on the receipt of an error message indicating that the existing address in a database is invalid. If a second email address for the desired recipient is available in the database, it may be used for sending additional messages, or a message that the current address is invalid may be generated. The updating of the address is, however, a manual activity with this system. Other patent applications have been published which address correcting invalid email addresses using correction algorithms that either correct common typographical errors, obtain addresses from a mail server address database, or search an independent database of known email addresses to find one that is similar. U.S. Patent applications US2002/0181466 (Neustein et al.), US2002/0188690 (Lee), US2003/0115279 (Quine et al.), and US2003/0225842 (Li et al.) are examples of these.

What is needed is a simple system that can identify the current email address accepted by the email server for the target person without internal access to the recipient's address database, send the desired email message, and provide the user a valid email address for future use.

SUMMARY OF INVENTION

This invention, the Email Address Identifier Software, Method, and System (EAI system) identifies an email address in real time based upon the target recipient data items that the user provides the system, and provides a desired message to the target recipient. In one embodiment using the Internet, there are three pieces of information that the user needs to provide the EAI system in order to identify the email address of the target recipient:

1. First Data Item (Example: First Name)
2. Second Data Item (Example: Last Name)
3. Server Address (Example: Internet Domain Name)

The user also will probably have the content for the email message they wish to send the desired recipient. So, for example, a user looking for the email address of John Doe at USA Corporation, Inc. would provide the system with the following information:

1. John
2. Doe
3. www.usa-corp.com

The EAI system guesses at possible candidate email addresses based on the data items and server address and tests them. Unlike the email databases method, the EAI system is not finding an email address that has already been reordered in a database that may be outdated. Unlike address correction software proposed to date it does not require the email address be in a database the user can access directly. Unlike mailing lists, it does not create a pre-recorded list of email address and then categorize and sell them. The user is using the EAI system at their discretion to identify the most up-to-date, valid email address of any particular person at any time using the inherent functionality of email servers.

The system exploits the characteristic of email servers to send a delivery failure notification, or bounce, for email that cannot be delivered. In computer jargon, a bounced email is one that never arrives in the recipient's inbox and is sent back, or bounced back, to the sender with a delivery failure notification message that indicates to the sender that the email was not successfully transmitted. Prior to generating a bounce message the email server will determine if the recipient actually exists within its system and if that recipient is allowed to accept emails. For example, if the sender has misspelled the recipient's address then the email server will recognize this as a nonexistent address and bounce the message back with a bounce message.

Messages may also be bounced if the recipient exists but their email account is non-functional. Reasons for this may be the recipient does not have enough disk space to accept the message, that is if his e-mail application is filled to storage capacity, or some mail systems predetermine a maximum message size that it will accept and will automatically bounce the message if it exceeds that size. Some mail systems predetermine a maximum amount of disk space the user is allowed to occupy on the server and bounce emails if this disk space is exceeded.

The system consists of five functional components, one a target recipient's email server connected to a network with the user, operative with a known server address and capable of providing a bounce message in response to a failed attempt to deliver an email with an incorrect address. Two, an email address identifier send server connected to a network with the target recipient's email server and operative to guess from the target recipient's data items a multiplicity of a desired recipient's possible email addresses at the known email server address, to send email to the guessed email addresses sequentially as requested, and to determine if all guessed email addresses have been sent an email. Three, an email address identifier read server connected to an email server on a network with the target recipient's email server and operative to guess from the target recipient's data items a multiplicity of a target recipient's possible email addresses at the known server address, to determine if a particular guessed email address has been sent an email by the email address identifier send server, to identify a valid email address if no bounce message is received from the target recipient's email server, to recognize a bounce message from the target recipient's email server, and to request the email address identifier send server send the next guessed email address an email upon receipt of a bounce message, or identify the email address could not be found if all guessed email address have been sent an email by the email address identifier send server. Four, a database server connected to the email address identifier read and send servers and operative to maintain a record of results of the send server and read server operation, and five, a user interface operative to receive the target recipient's data items and email server address, and to provide either the valid email address or a message that the email address could not be found to the user.

OBJECTS AND ADVANTAGES

One objective of the EAI system is to enable the user to send an email message to any person, without knowing the target recipients email address, as long as the user knows some data items, that is information about the target recipient (example first and last name). The target recipient is the person for whom the user is trying to identify the email address and/or to whom the user is sending an email message.

A second objective of the EAI system is to enable a user to identify the email address of any person, without knowing the target recipient email address, as long as the user knows some data items, that is information about the target recipient (example first and last name).

A third objective of the EAI system is to enable the user to monitor and record the emails they have sent using the EAI system.

BRIEF DESCRIPTION OF DRAWINGS

A more complete understanding of the invention can be obtained by considering the detailed description of the invention in conjunction with the accompanying drawings, in which.

DETAILED DESCRIPTION

Figure 1:
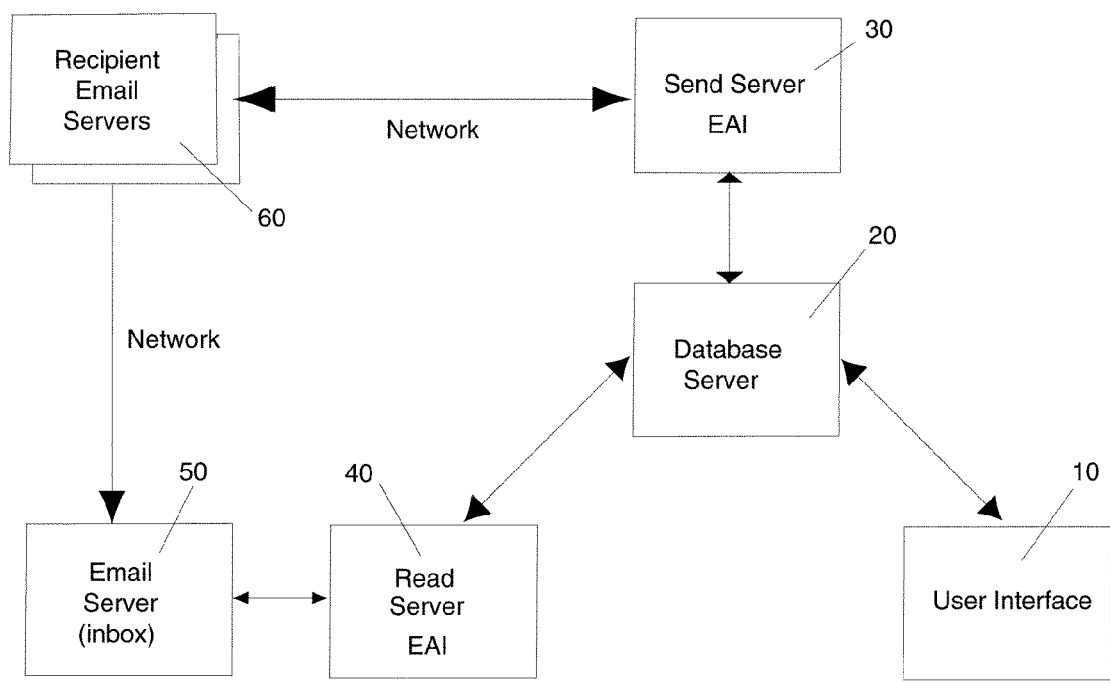
FIG. 1 enumerates the software modules used in the EAI system and their relationship to one another. The core EAI system software algorithms are contained in the Send Server and the Read Server software as shown on the chart.

FIG. 1 shows an arrangement of the EAI system using six server software modules to implement the five functions of the invention.

The user interface (10) may be provided by a network or web server. The user accesses the web server with their computer over the Internet, or other computer network, and through this interface the EAI system may be initiated and controlled. The network or web server allows the user to enter requests for email addresses and to view the progress of past queries. The search for an email address starts here. The first name, last name, and domain entered by the user are placed in a queue in the database. The EAI system has been designed to use any common web server software, such as Apache, Mirosoft's IIS, VisNetic WebSite, etc.

Note that a web server is not required. Its role here is simply to get a user's input and store it in a database and display results. The EAI system could use any user interface. This functionality can also be written in any computer language.

The data base server (20) uses the EAI system database server software module. This provides the persistent data store. The user interface (10), send server (30), and read server (40) read from and write to this server. Recording or reading data indicated in the figures is by writing or reading from the database server. The EAI system has been designed to use any database server software, such as MySQL, Oracle, or Microsoft SQL Server.

The send server (30) uses the EAI system send server software module. This server is responsible for sending emails to candidate addresses. It also updates the status of a request based on whether or not all possibilities have been tried. Core EAI system email address guessing algorithms are resident in the EAI system send server.

The read server (40) uses the EAI system read server software module. This server is responsible for monitoring the email sent by the send server, reading a bounce resulting from a failed attempt, and generating a request that the send server try the next guess. EAI system email address guess algorithms are resident in the EAI system read server.

The email server (50) is the EAI system mailbox used to capture bounces that are generated when the send server sends an email to an email address that is not recognized by the recipient's email server. The email server may use the POP3 (Post Office Protocol Version 3) protocol or other email receipt protocol compatible with the recipient's email server.

The recipient's email server(s) (60) are the email servers with which the EAI system send server and email server communicates over some form of network. Most current email servers use the SMTP (Simple Mail Transfer Protocol) protocol for sending email between server(s). The email is then retrieved using POP3 or other protocol that handles email for the domain of the recipient.

Figure 2:
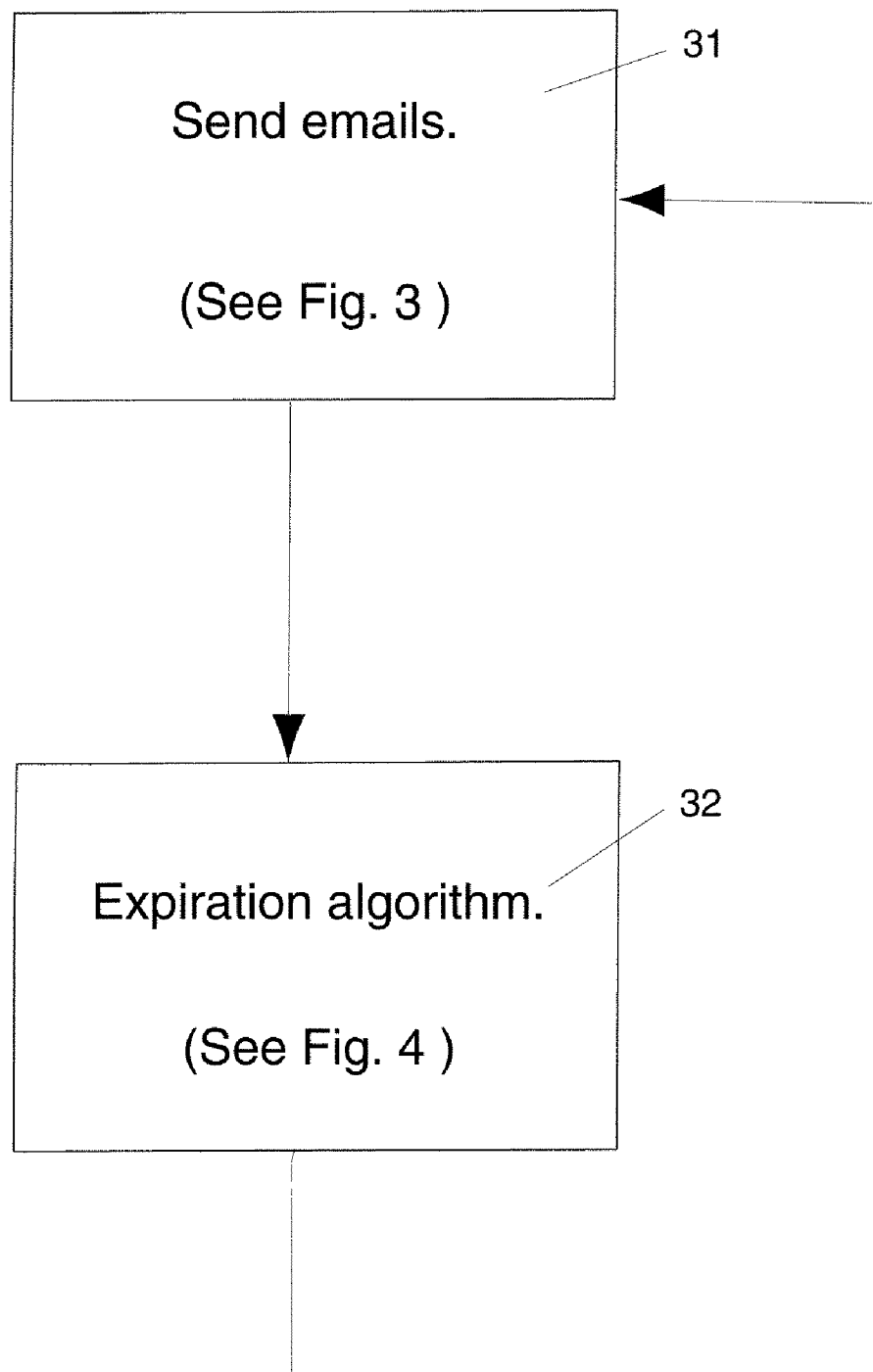
FIG. 2 is a flow chart of the interaction of the two core algorithms used in the Send Server module of the EAI system: the Send emails algorithm and the Expiration algorithm.
Figure 3:
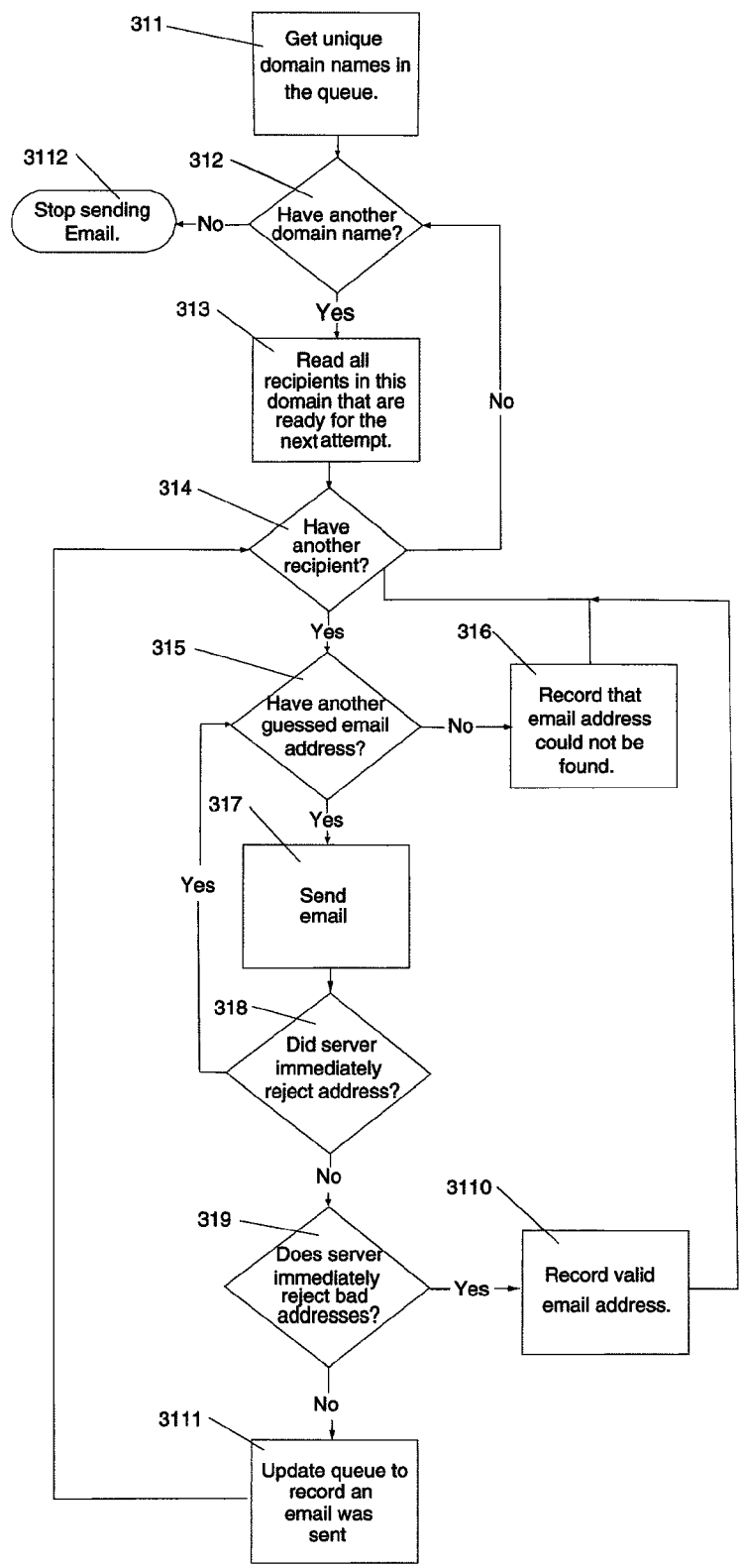
FIG. 3 is a flow chart showing details of the EAI system Send emails algorithm, used by the Send server.
Figure 4:
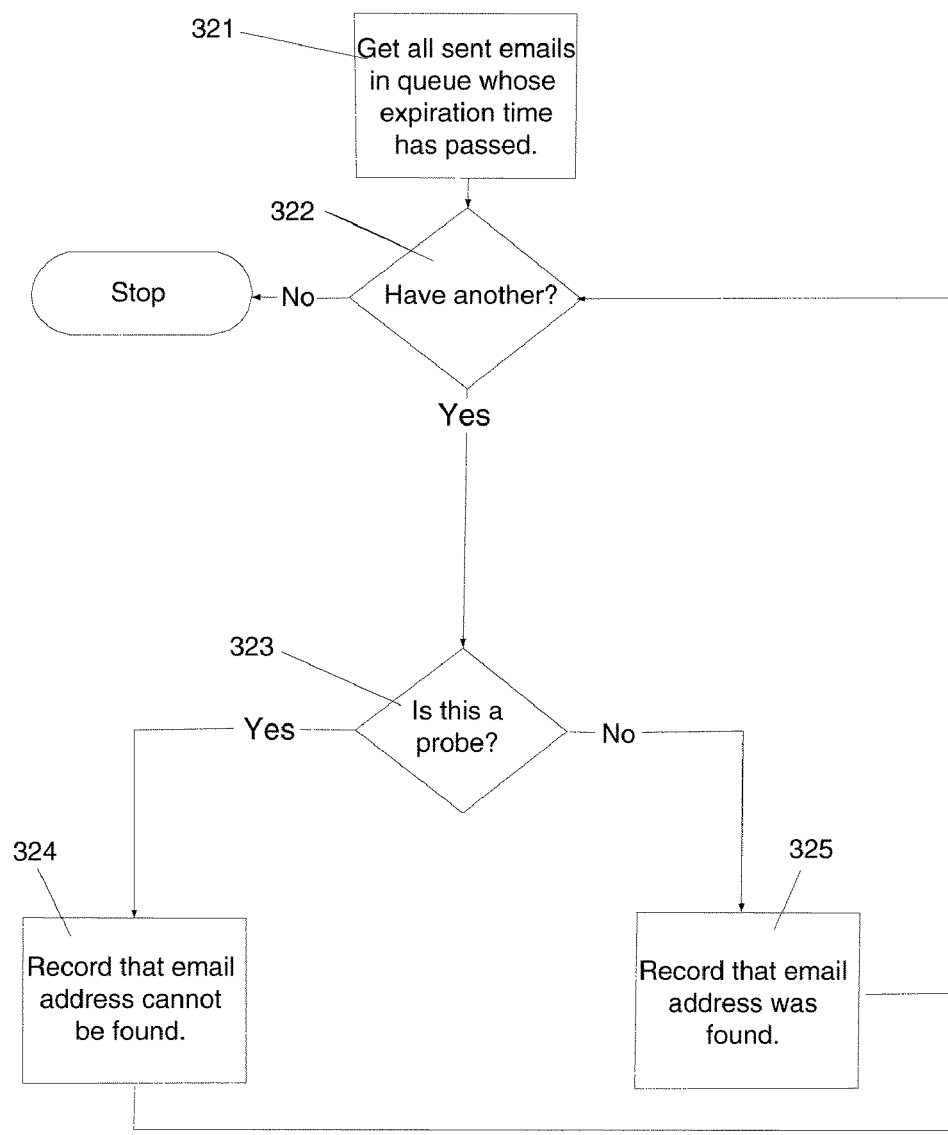
FIG. 4 is a flow chart showing details of the EAI system Expiration algorithm, used by the Send server.

FIG. 2 is the send server top-level flow chart and it provides an index to FIGS. 3 and 4. The send server software module embodies the two key algorithms shown, the "Send emails" algorithm (31) creates email addresses based on the users input and sends them to the target recipients. The Expiration algorithm (32) handles expired attempts to determine if the recipient email server accepted an email address.

FIG. 3 shows details of the EAI system send server send emails algorithm (31). This is used to send emails to candidate addresses. "Get unique domain names in the queue." (311) examines the queue to determine all the unique domains. Then addresses are grouped by domain to optimize the communication with the email servers. The object is to open each server once and send it all the email that is targeted for its domain. "Have another domain name." (312) is a decision step. Here the program loops through the remaining domains found in step 1 to determine whether it is necessary to send further email, or stop sending email (3112). If the decision is to send further email, then the next step is to "Read all recipients in the selected domain that are ready for the next attempt." (313). Then the system selects the next target recipient read from the domain in "Have another recipient?" (314) and commences to begin guessing email addresses for the recipient in "Have another guessed email address?" (315). If the system can generate another guess at the email address, it will. If the system has run out of guesses it will update the database to indicate that no address was found in "Record that email address could not be found" (316) and the "Have another guessed email address?" (315) will select the next recipient. Assuming the system has another guess of the first recipient, it sends the email in "Send email." (317).

"Did server immediately reject address." (318) is a read to determine if the recipient email server rejected the address. If it did, the system will determine if there is another address guess for the target recipient. If the target recipient email server did not reject the address, the system will determine "Does server immediately reject bad addresses?" (319) to confirm the application email server bounces bad email addresses. What the system gets here is the server did not reject the last guess at the email address. The system knows the server would have rejected the address if it was a bad address, thus it knows this one is good and it will proceed to "Record valid email address" (3110), otherwise it moves to "Update queue to record an email was sent." (3111) to update the status of the search.

FIG. 4 shows details of the EAI system send server "Expiration algorithm." (32) from FIG. 2. This algorithm determines if the system has waited long enough for a failure delivery notification. If one isn't received by the time the expiration time is over, the system declares that the desired address was found. There is an important distinction between the first email address for each domain that the EAI system tries, called the probe email, and all subsequent attempts. The probe email is designed to be invalid and is expected to generate a bounce. The EAI system expects that a valid address will not generate a bounce, but if a bounce is not received for the probe address, the EAI system concludes that invalid addresses will not be rejected and thus it can not determine what address is valid.

"Get all sent emails in queue whose expiration time has passed" (321) reads the list of emails that have not received a bounce within the designated expiration time. "Have another?" (322) loops through the list to see if the system has another email in this list to process. "Is this a probe?" (323) checks if the email under consideration is a probe email (i.e. the email developed to be a non-existent account at the domain under consideration). If it is, the system implements "Record that email address cannot be found." (324) The system is here if it just sent the probe email and did not get a failure message. This indicates that it won't get failure messages for bad addresses and thus it doesn't have a way of telling if something is invalid, or if it is valid, so it stops the search and updates the database with this information. Conversely if the email is not a probe the system implements "Record that email address was found." (325). The address guess that is not rejected is presumed to be valid and the system declares success.

Figure 5:
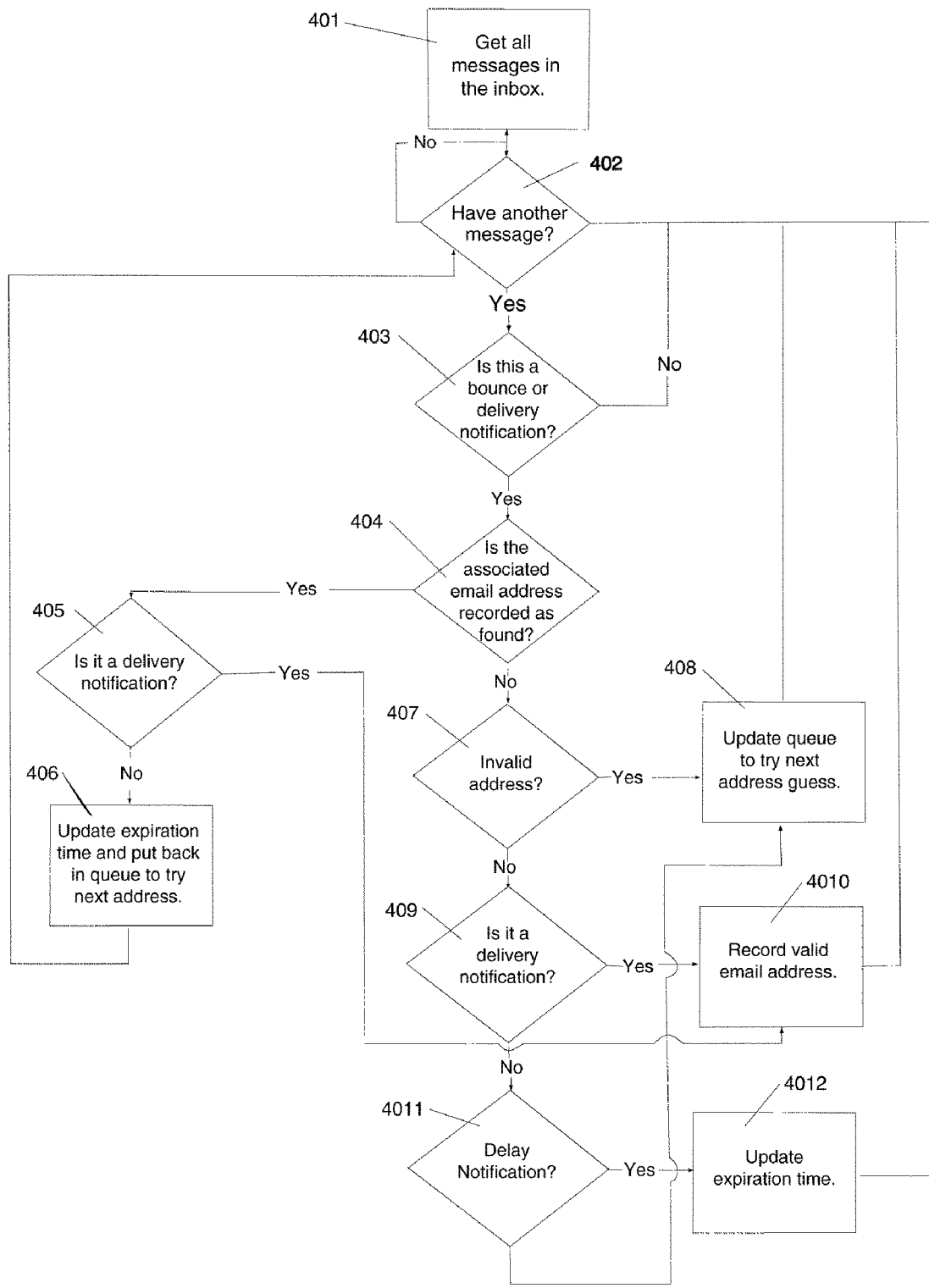
FIG. 5 is a flow chart showing details of the core read server software module algorithms of the EAI system.

FIG. 5 shows the EAI system read server algorithm. This monitors the EAI system email server (40) shown on FIG. 1 for bounce messages and takes appropriate action. The algorithm starts with "Get all messages in the inbox" (401). Here the system checks the mailbox. With "Have another message?" (402) the system loops through the messages in the mail box.

"Is this a bounce or delivery notification?" (403) determines if an email is a delivery notification. The system only process emails that are delivery notifications and will choose the next email if one is determined to be otherwise.

"Is the associated email address recorded as found?" (404) checks to see if the email address associated with the email message has already been declared valid because the expiration time expired. Here it may get a late rejection notice for it. If the address was declared as valid, "Is it a delivery notification?" (405) determines if the email is a delivery confirmation and if this is the case the system is done and will "Record valid email address." (410) and go on to the next message, "Have another message? (402). If the message is not a delivery confirmation, "Update expiration time and put back in queue to try next address." (406) returns the email address associated with the email message back in the processing queue and continues on with the next message.

If the address was not found to be recorded as found, "Invalid address?" (407) determines if the bounce is due to an invalid address rather than a non-functional email account. If the email is due to an invalid address, "Update queue to try next guess." (408) updates the queue to tell the send server to try the next guess. If the email is not due to an invalid address, "Is it a delivery notification?" (409) determines if the email is a delivery confirmation and if this is the case the system is done and "Record valid email address." (4010) records that success.

"Delay notification?" (4011) determines if the message is that the recipient email server (60) needs more time to deliver the email. If so then "Update expiration time." (4012) increases the expiration time for that email in the expiration algorithm in FIG. 4.

Here is an example of how the system software functions. First the user will input the data items known about the target recipient through the user interface (10):

First Name: John
Last Name: Doe
Internet Domain: www.usa-corp.com

The following are samples of the guesses or candidate addresses based on name that the EAI system will develop as shown in FIG. 3. In this example, the guesses are based on common practices in developing email addresses from names, and use the spelling of the name of the desired recipient and the initials in combination with these practices to generate the guesses. The data items may be based on other information from which email addresses may be developed, for example, location, code numbers, nicknames, or code names and so forth. Each will be tried, one at a time, until the correct one is identified. The order in which the guesses are tried may be varied to enhance performance. The guesses generated will be varied as practices in developing email addresses evolve and with differing email networks 1. john.doe@usa-corp.com
2. john_doe@usa-corp.com
3. johnd@usa-corp.com
4. johndoe@usa-corp.com
5. jdoe@usa-corp.com
6. jd@usa-corp.com
7. john@usa-corp.com
etc.

The system uses two processes to ensure that bounces are handled properly as shown in FIG. 4. The first process is the first email sent is a probe email that is sent to a dummy address at the domain in question. An example of a probe email is xyzst@usa-corp.com. The probe email is designed to be an invalid email address that will be rejected by the target recipient email server. This is sent so the EAI system will receive a bounce from the target recipient email server. If the target recipient email server is working properly, it should generate a bounce message. If it does not, the system notes that this domain will not send bounces and notifies the EAI system user that the email cannot be delivered based upon the data given. The second process is the expiration algorithm. The EAI system will only wait for responses for the designated expiration time in order to provide the user with timely feedback. When this expiration time is exceeded, the system either gives up trying, if it is waiting for a response from the sent probe email, or it notifies the user that the email was successfully delivered. However, due to the vagaries of the Internet, some bounces may not arrive for an extended time period, even days. The EAI system will process these anyway. If it gets a bounce for an email address guess that has already expired, the system will reactivate the search for that recipient's email address.

Figure 6:
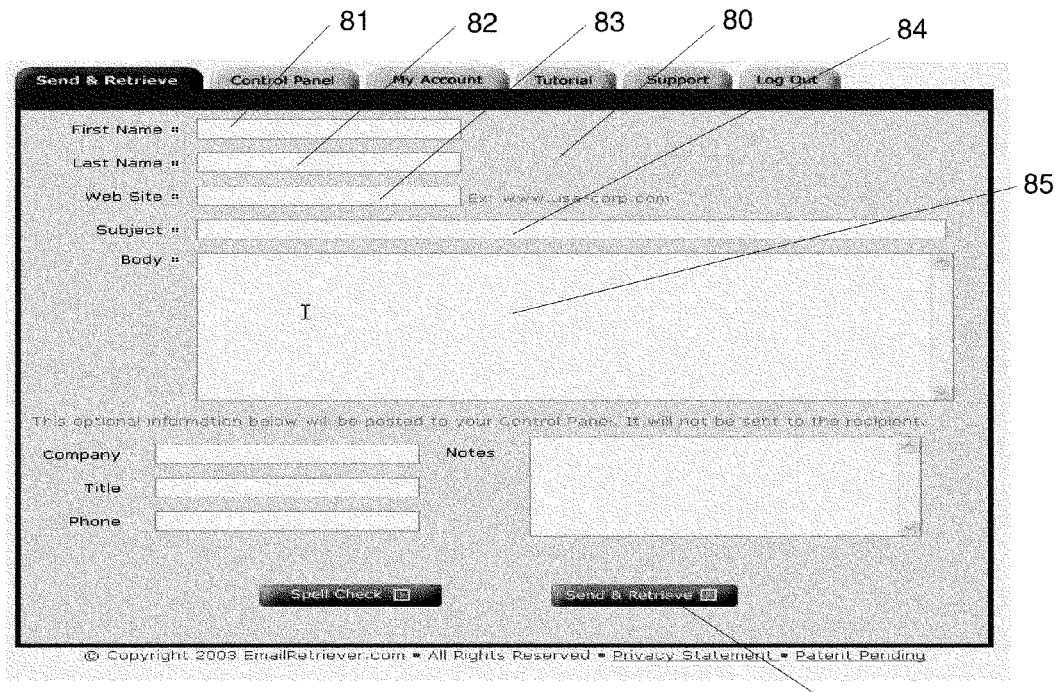
FIG. 6 is a screen shot of an internet embodiment of the EAI system send & receive window.

If the EAI system is deployed as an Internet online service, the user uses the EAI system to send a desired email on their behalf. FIG. 6 shows an example of an input screen with this deployment. This system is optimized so when the EAI system successfully delivers an email on behalf of the user: the target recipient will see the user/sender's registered email address in the from box, so that the user/sender will be immediately identified as the true sender of the email, and the target recipient can also reply to the sender/user simply by hitting the reply button, so that reply will go directly back to the user/sender of the EAI software, who is the sender of the email, rather than to the EAI system mailbox.

Simultaneously, while this personalization of the from email address is created, the EAI system will handle all the bounce email receipts, so the user/sender does not have the trouble of receiving them in their return email box. This personalization is accomplished through the judicious use of email headers and through commands sent to the recipient servers.

Internet email is sent using the Simple Mail Transfer Protocol (SMTP). The EAI system uses this standard protocol to guarantee that the EAI system gets delivery notifications instead of the user. The first thing done is to send an email to determine what SMTP mail server(s) manage mail for the given desired recipient's domain. This is done via standard calls to the local domain name server. If more than one SMTP server is available they are kept in a list ordered by priority. Once these are determined, communications begins with the SMTP server with the highest priority that services the recipient's domain. If it is currently unavailable, the next server in the list is tried. Then, for each email, the SMTP "mail from" command is sent, e.g.: mail from:eai@eaihost.com. This tells the SMTP server to send delivery failure notifications or bounces to the given email address. The EAI system supplies it's email address here which means it, and not the client user, will get the delivery notifications.

The SMTP server has been told to send deliver notifications to the EAI system, but it is desired to send replies from the recipient to go to the EAI system user. This is done by setting the following email headers: From and Reply To headers: The value used here is the user's email address. Sender header: The value used here is the EMR email address. SMTP servers typically don't do anything with this, but some may add their own headers to the email to indicate that the message may be a forgery if the address used in the "mail from" command given to the SMTP server does not match that found in the Sender header. The EAI system makes it match.

There are two ways the EAI system determines that an email address is invalid. Both ways use a bounce message from the target recipient email server. First, it looks for an immediate bounce response from the target recipient email server itself. Some servers respond as soon as the target recipient email address is received. If this is the case, the EAI system moves on to the next guess. This happens before the recipient email server actually tries to deliver the email. Second, if the target recipient email server does not reject bad email addresses immediately, the EAI system expects to get a delivery notification email later telling us that the address is invalid. The EAI read server (40) software module looks for these emails.

Additional Embodiments

The EAI system "Email Address Identifier Software" has been designed to flexibly allow use of many operating systems, combinations of servers and databases and deployment configurations to host the system, and email systems, and can be written in many computing languages, such as Java, C++, or others. Even though the preferred embodiment shows the use of six server software modules, it could be combined into a single program. The EAI system software is highly portable and is platform independent. It can be deployed on any platform, such as Linux, Windows, UNIX, or others.

The EAI system is server independent. It has been designed to use any type web server, such as Apache, Microsoft's IIS, VisNetic WebSite, etc., including non-web user interface servers. It will use any type of database server, such as MySQL, Oracle, Microsoft SQL Server, or others. It will use any type of email server using any type of recipient email server protocol.

The example interface shown in the preferred embodiment, and the diagrams and flowcharts illustrate the EAI system being deployed as an Internet online service where the user can access the software via a web browser such as Internet Explorer or Netscape. It may be used on any deployment configuration. For example, the EAI system can be deployed to maintain a database identifying potential and actual customers or clients that can be integrated into other software such as a Customer Relationship Management (CRM) system or a customer information online service. Or it could be deployed as a desktop application with the software installed on to a computer to maintain a database of addresses that can be integrated into email systems such as Outlook, Eurdora, or others to maintain the address book in the system. It may also be deployed on wireless devices for maintaining an email database on a mobile computing device, or in combinations and/or hybrids of these deployment configurations.

Operation

This example illustrates how a typical user may access the EAI system. In this example a user desires to send an email notifying potential customers of news about a product or service of interest. The user will login to the EAI system using a web browser and input the name and the Internet domain of the persons they are trying to contact using the EAI system send & receive window (80) as shown in FIG. 6. The first name (81), last name (82) and Internet domain, termed web site (83) are input where shown. The user can then input the subject (84) and write the message body (85) in the space provided. The user may also keep customer information in the system database. The list of customers may have been obtained from returned emails that were previously sent to potential customers whose email addresses have changed. The user can then press the Send & Retrieve button (86) on the EAI system send & receive window to input the data. Once the EAI system receives this data input, the system will then deliver the email to the target recipients.

Figure 7:
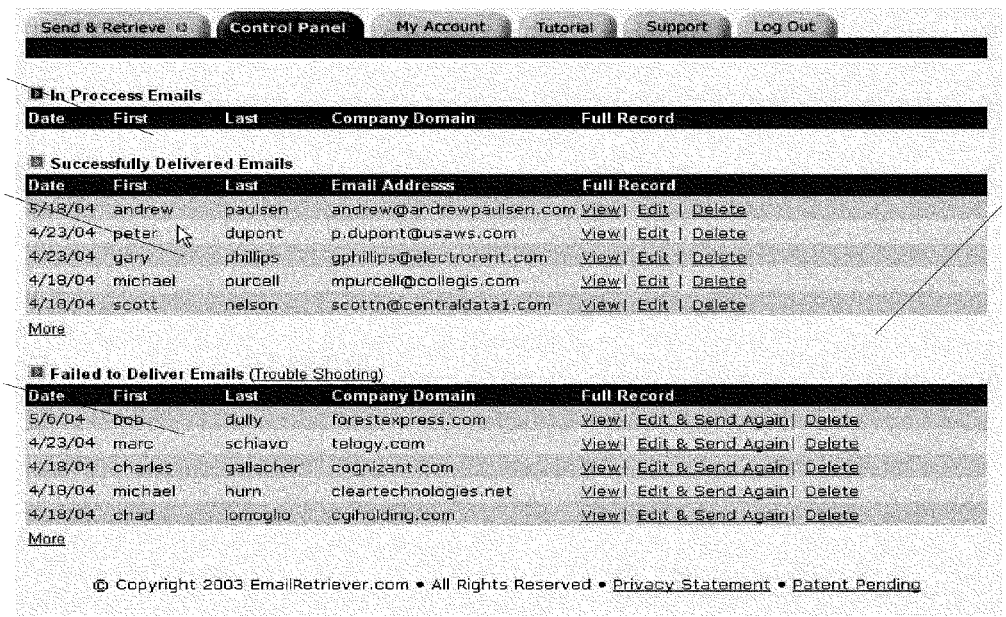
FIG. 7 is a screen shot of an internet embodiment of the EAI system control panel.

The user may select the EAI system control panel (90) giving the user a complete view into their use of the EAI system as shown in FIG. 7. Once the email is delivered, the target recipient correct email address will be displayed in the users control panel window, along with a copy of the delivered email. The data view lists the email activity in several categories. The In Process Emails list (91) gives the emails that are in the process of being sent to the user's target recipients. The Successfully Delivered Emails list (92) shows the emails that have been delivered successfully as well as the email address of the target recipient, and the Failed to Deliver Emails list (93) shows failed attempts to deliver the email to the target recipient.

We claim:

1. A computerized method for determining a desired recipient's email address comprising:
 a. choosing one or more target recipients;
 b. providing a unique email server address for each target recipient;
 c. providing two or more first target recipient's data items;
 d. guessing a plurality of first target recipient's candidate email addresses from the unique email server address and data items;
 e. developing a known invalid email address for the unique email server address;
 f. sending a probe email addressed to the known invalid email address;
 g. monitoring a response of a target recipient email server for the unique email server address;
 h. determining, from the response, whether the target recipient email server issues a bounce in response to the sending of an email to an invalid email address;
 i. recording that the email address cannot be found if no bounce to the sending of the probe email occurs; and
 if the target recipient email server issues a bounce in response to the sending of the probe email, then:
 j. sending an email to the first target recipient's first guessed email address;
 k. monitoring the response of the target recipient email server to determine if a bounce occurs;
 l. recording a valid email address if no bounce occurs;
 m. sending a second email to the target recipient's second guessed email address if a bounce occurs;
 n. repeating j, k and m using the plurality of first target recipient's guessed email addresses in succession until l occurs or there are no other first recipient's guessed email addresses;
 o. guessing a plurality of second target recipient's candidate email addresses;
 p. repeating j, k, l, m and n using the plurality of second target recipient's guessed email addresses.

\* \* \* \* \*